H. B. VAN VLIET.
RUNNER FOR CHILDREN'S CARRIAGES.
APPLICATION FILED OCT. 21, 1907.

901,500.

Patented Oct. 20, 1908.
2 SHEETS—SHEET 1.

WITNESSES

INVENTOR
HERBERT B. VAN VLIET
BY Paul & Paul
HIS ATTORNEYS

H. B. VAN VLIET.
RUNNER FOR CHILDREN'S CARRIAGES.
APPLICATION FILED OCT. 21, 1907.

901,500.

Patented Oct. 20, 1908.
2 SHEETS—SHEET 2.

WITNESSES

INVENTOR
HERBERT B. VAN VLIET
BY Paul & Paul
HIS ATTORNEYS

UNITED STATES PATENT OFFICE.

HERBERT B. VAN VLIET, OF BLACKDUCK, MINNESOTA.

RUNNER FOR CHILDREN'S CARRIAGES.

No. 901,500.  Specification of Letters Patent.  Patented Oct. 20, 1908.

Application filed October 21, 1907. Serial No. 398,400.

*To all whom it may concern:*

Be it known that I, HERBERT B. VAN VLIET, of Blackduck, Beltrami county, Minnesota, have invented certain new and useful Improvements in Runners for Children's Carriages, of which the following is a specification.

The object of my invention is to provide means whereby runners can be suspended beneath a child's carriage and lowered to rest upon the ice or snow and support the carriage, or be lifted to an inoperative position between the wheels.

A further object is to provide a means for operating the runners which will be simple in construction and operation but very durable and reliable in its action.

A further object is to provide runners and means for attaching the same to a carriage, which can be adjusted lengthwise of the carriage or laterally thereon to adapt the device for different sizes and makes of carriages.

The invention consists generally in a folding frame supporting the runners, a locking device for holding said frame in its suspended position, springs for normally holding said frame in its folded position and means actuated by the foot of the attendant for tripping said locking means.

Figure 1:
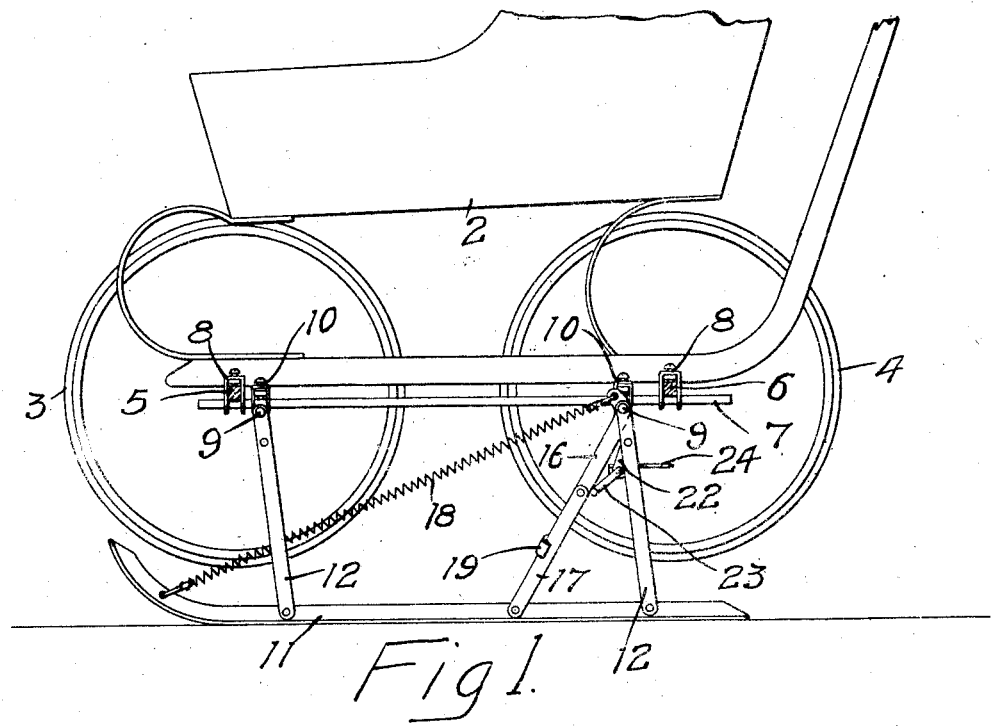
Figure 2:
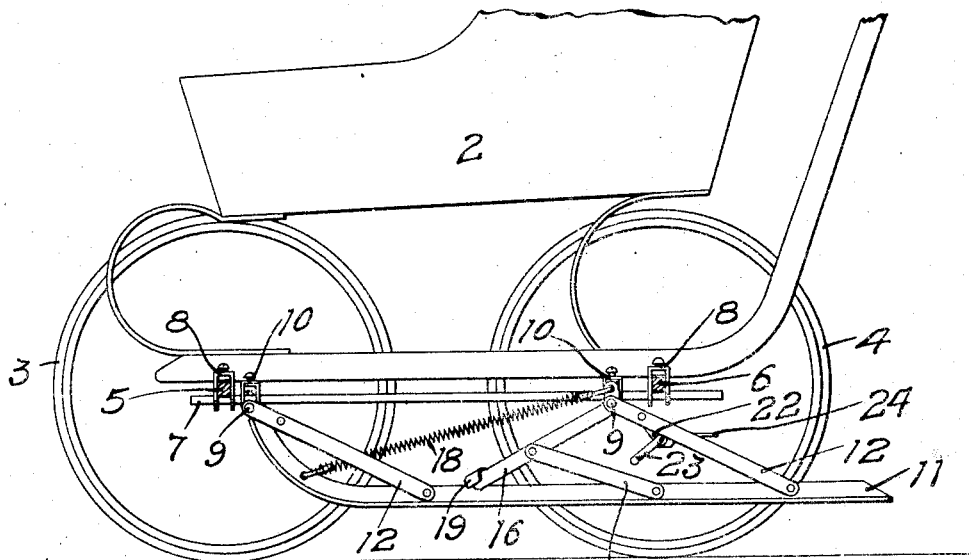
Figure 3:
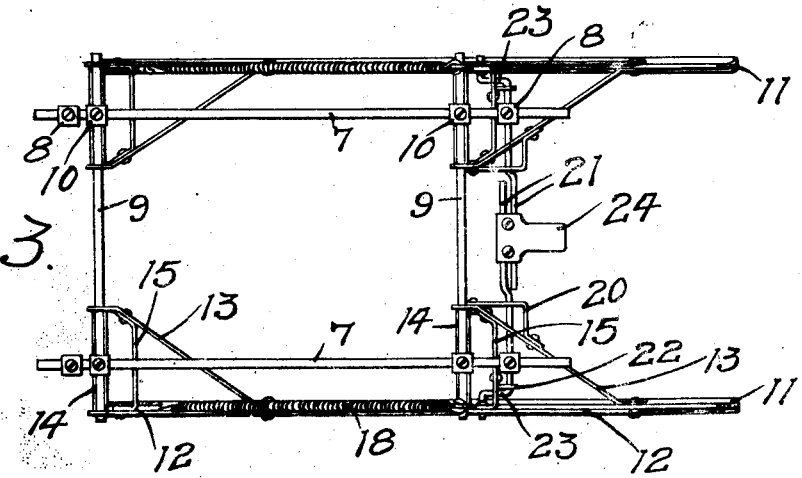
Figure 4:
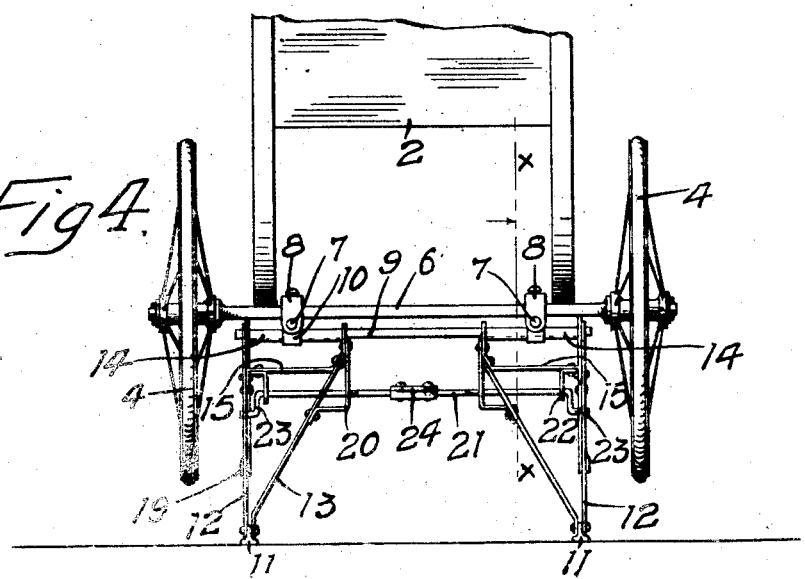
Figure 5:
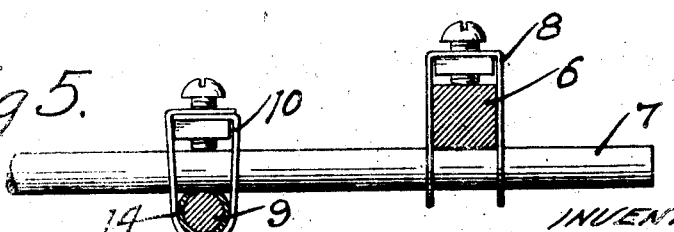

In the accompanying drawings, forming part of this specification, Figure 1 is a side elevation of a child's carriage with my invention applied thereto showing the frame unfolded and the runners ready for use. Fig. 2 is a similar view showing the runners raised to an inoperative position. Fig. 3 is a top view of the device removed from the carriage. Fig. 4 is a rear elevation showing the runners ready for use, and Fig. 5 is a sectional view on the line *x—x* of Fig. 4.

In the drawing, 2 represents a child's carriage of the ordinary type having forward and rear wheels 3 and 4 provided with axles 5 and 6. 7 represents parallel rods secured to the wheel axles by a series of clamps 8. Forward and rear cross rods 9 are provided at right angles substantially to the rods 7 and secured thereto by clamps 10. The clamps 8 and 10 are adjustable so that the runner frame can be readily adapted for any size or width of carriage, and the adjustment of the clamps 10 on the rods 7 allows the runners to be set in any desired position beneath the carriage frame. The runners 11 have upwardly turned forward ends. Links 12 connect the forward ends of the runners with the outer ends of the forward cross rod 9. A brace 13 connects the runner on the inside with the rod 9 and the said rod has a long tubular bearing 14 between the link 12 and the brace 13 in which bearing the said rod is adapted to slide when the frame is being adjusted. A cross brace 15 connects the brace 13 with the link 12. The construction at the three other bearing points or the corners of the frame is the same as described and the same reference numerals may be used for the corresponding parts.

When the runners are moved to an operative position the links 12 at the front and rear will be substantially vertical, and to lock them in such position I provide toggle links 16 and 17 pivotally connected to one another at one end, the opposite ends of the links being pivoted to the runners and to the rear cross rods 9. The upper ends of the links 16 are connected by coiled springs 18 with the forward ends of the runners, said springs normally tending to draw the forward ends of the runners backwardly and lift them to their inoperative position. The links 16 lap by the links 17 and are provided with flanges 19 which engage the said links 17 and limit the movement of the links backward. When these links are in line with one another their action will be the same as a toggle joint and the runners will be locked in their depressed position and the wheels of the carriage will be raised out of contact with the ground. The rear braces between the runners and the supporting rods above are provided with straps 20 in which rods 21 are mounted. These rods have downwardly turned ends 23 which terminate near the pivotal connection between the links 16 and 17. A foot piece or treadle 24 is mounted on the rods 21 and by depressing the same the attendant can trip the toggle joints, moving the links 16 and 17 out of line with one another, so that the power of the springs 18 will be exerted to lift the runners and swing them backwardly beneath the carriage axles and a sufficient distance above the ground to prevent contact therewith.

I claim as my invention:

1. The combination, with a child's carriage and forward and rear axles and carrying wheels therefor, of rods secured to said axles, links pivotally and adjustably supported on said rods and adapted to swing upwardly beneath said axles or down to a substantially vertical position, and runners carried by said links and adapted when lowered to raise said carrying wheels out of contact with the ground, substantially as described.

2. The combination, in a child's carriage, with the forward and rear axles and carrying wheels therefor, of rods extending lengthwise of the carriage and clamps for securing said rods to said axles, cross rods and means for clamping them to said longitudinal rods, said rods being adjustable upon one another and upon said axles to adapt them for use on carriages of different sizes, and a folding runner mechanism carried by said rods and adapted to swing up under said axles or move down into contact with the ground, substantially as described.

3. In a child's carriage, the combination, with the forward and rear axles and carrying wheels therefor, of parallel rods and means for clamping them on said axles, said means being adjustable to permit the rods to be moved toward or from one another, cross rods adjustably mounted on said first named rods, runners and means for pivotally connecting them with said cross rods and means for locking said runners in their depressed position.

4. The combination, with the forward and rear axles, and carrying wheels therefor, of rods secured to said axles, runners arranged beneath said rods, links pivotally connecting said runners with said rods, toggle links provided between said runners and said rods, springs connecting the forward and rear portions of said runners with said toggle links and normally tending to hold said runners in their elevated position and said springs being put under tension by the depression of said runners and the straightening of said toggle links, and means adapted to be actuated by the foot of the attendant for tripping said toggle links and allowing said springs to return said runners to their elevated position, substantially as described.

5. The combination, with the forward and rear axles, and carrying wheels therefor, of rods secured to said axles, runners arranged beneath said axles, links pivotally connecting said runners with said rods, links forming toggle joints connecting the rear portions of said runners with said rods, said toggle joints when straightened, locking said runners in their depressed position, spiral springs connecting said toggle links with the forward portions of said runners, a treadle provided beneath the rear axle, and rods secured to said treadle and having ends arranged to engage and trip said toggle links and thereby permit said springs to elevate said runners, substantially as described.

6. The combination, with the forward and rear axles, and carrying wheels therefor, of longitudinal rods secured to said axles, cross rods secured to said longitudinal rods, runners arranged beneath said axles, links pivotally connecting said runners with said cross rods, braces having their lower ends attached to said runners, tubular bearings provided on said cross rods and connecting the upper ends of said braces and said links, spring devices arranged to normally hold said runners in their raised position, and means for locking said runners in their depressed position, substantially as described.

7. The combination, with the forward and rear axles and carrying wheels therefor, of runners supported beneath said axles, links pivotally connected with said runners and supported by said axles, coiled springs attached to the forward ends of said runners and toggle links connected to said springs, said links when straightened locking said runners in their lowered position, said springs being put under tension when said runners are lowered, to return them automatically to their raised position when released, and means for tripping said toggle links.

8. The combination, with the forward and rear axles and carrying wheels, of runners, links whereon said runners are pivotally supported, said links being adapted to swing to an inclined position to allow said runners to be raised to an inoperative position between the wheels, springs connected to said runners and adapted to raise them to an inoperative position, means for locking said runners in their lowered position against the tension of said springs, a lock-tripping bail adapted to be operated by the foot of the attendant for tripping said locking means and allowing said runners to be automatically lifted to an inoperative position, substantially as described.

In witness whereof, I have hereunto set my hand this 25th day of September 1907.

HERBERT B. VAN VLIET.

Witnesses:
RICHARD PAUL,
J. H. BALDWIN.